(12) United States Patent
Egger et al.

(10) Patent No.: US 8,555,097 B2
(45) Date of Patent: Oct. 8, 2013

(54) RECONFIGURABLE PROCESSOR WITH POINTERS TO CONFIGURATION INFORMATION AND ENTRY IN NOP REGISTER AT RESPECTIVE CYCLE TO DEACTIVATE CONFIGURATION MEMORY FOR REDUCED POWER CONSUMPTION

(75) Inventors: Bernhard Egger, Seoul (KR); Soo-jung Ryu, Cheonan-si (KR); Dong-hoon Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 711 days.

(21) Appl. No.: 12/609,920

(22) Filed: Oct. 30, 2009

(65) Prior Publication Data
US 2010/0199068 A1 Aug. 5, 2010

(30) Foreign Application Priority Data
Feb. 5, 2009 (KR) .................... 10-2009-0009409

(51) Int. Cl.
*G06F 1/32* (2006.01)
(52) U.S. Cl.
USPC ............................................ 713/323; 712/15
(58) Field of Classification Search
None
See application file for complete search history.

(56) References Cited

U.S. PATENT DOCUMENTS

| | | | |
|---|---|---|---|
| 5,524,249 A | 6/1996 | Suboh | |
| 5,608,686 A | 3/1997 | Takai | |
| 6,202,143 B1 | 3/2001 | Rim | |
| 6,671,815 B2 | 12/2003 | Iwamura et al. | |
| 6,678,832 B1 | 1/2004 | Gotanda | |
| 7,290,122 B2 | 10/2007 | May et al. | |
| 7,514,957 B2 * | 4/2009 | Schmit et al. | 326/38 |
| 7,653,820 B1 * | 1/2010 | Trimberger | 713/191 |
| 7,795,908 B2 * | 9/2010 | Awata | 326/38 |
| 2009/0228612 A1 * | 9/2009 | Rai | 710/14 |
| 2010/0174885 A1 * | 7/2010 | Park et al. | 712/15 |

FOREIGN PATENT DOCUMENTS

| | | |
|---|---|---|
| JP | 2008-009473 X | 1/2008 |
| KR | 91-12910 C | 8/1991 |
| KR | 1999-023161 B | 3/1999 |
| KR | 20010033509 A | 4/2001 |

* cited by examiner

Primary Examiner — Kenneth Kim
(74) Attorney, Agent, or Firm — NSIP Law

(57) ABSTRACT

Described herein is a reconfigurable processor which uses a distributed configuration memory structure and an operation method thereof in which power consumption is reduced. A processing unit which configures the reconfigurable processor includes a functional unit, a distributed configuration memory, a no-operation (NOP) register, and a controller. The NOP register stores information which represents whether or not a NOP operation is performed at each clock cycle. The controller controls to deactivate the distributed configuration memory at a clock cycle at which a NOP operation is performed.

16 Claims, 3 Drawing Sheets

RECONFIGURABLE PROCESSOR WITH POINTERS TO CONFIGURATION INFORMATION AND ENTRY IN NOP REGISTER AT RESPECTIVE CYCLE TO DEACTIVATE CONFIGURATION MEMORY FOR REDUCED POWER CONSUMPTION

CROSS-REFERENCE TO RELATED APPLICATION

This application claims the benefit under 35 U.S.C. §119(a) of a Korean Patent Application No. 10-2009-0009409, filed Feb. 5, 2009, in the Korean Intellectual Property Office, the entire disclosure of which is incorporated herein in by reference for all purposes.

BACKGROUND

1. Field

The following description relates to a reconfigurable processor, and more particularly, to a structure of a coarse-grained array.

2. Description of the Related Art

Reconfigurable architecture refers the ability of underlying hardware architectures or devices to alter the functionalities of its components and the interconnection between them to perform a desired task. Examples of reconfigurable architecture include reconfigurable processors, coarse-grained arrays, and the like.

A reconfigurable processor is a microprocessor with erasable hardware that can rewire itself dynamically. This allows the processor to adapt effectively to the programming tasks demanded by the particular software they are interfacing with at any given time. For example, a reconfigurable processor can transform itself to a video chip, to a central processing unit (CPU), to a graphics chip, and the like.

A reconfigurable processor may be used in a system or a terminal for operating one or more communication modes, for example, a communication standard mode and/or a multimedia mode.

A processing unit typically includes a functional unit and a register. A plurality of functional units included in a coarse-grained array are typically operated using configurable information which is read in units of lines by a unified configurable memory. Typically, the unified configurable memory contains information for the functional units as well as information on operations performed by the functional units, information on a processing unit which is used by functional units to perform operations, information on where a value generated as an operation result is stored, and other information.

Thus, even when a functional unit does not use configuration information, a configuration memory continuously remains in an activated state, and power is continuously expended, because the other information may need to be accessed. This is not an efficient use of power.

SUMMARY

In one general aspect, there is provided a reconfigurable processor comprising a plurality of processing units, each of which includes, a functional unit, a distributed configuration memory which stores configuration information of the functional unit, a no-operation (NOP) register which stores information which represents whether or not a NOP operation is performed at a clock cycle, and a controller which deactivates the distributed configuration memory at a clock cycle at which a NOP operation is performed and activates the distributed configuration memory at a clock cycle at which a NOP operation is not performed.

The controller may manage an iteration interval, a first pointer which points to an entry of the NOP register, and a second pointer which points to an entry of the distributed configuration memory.

The controller may deactivate the distributed configuration memory when the first pointer points to a value in the NOP register that indicates a NOP operation is performed. The controller may activate the distributed configuration memory when the first pointer points to a value in the NOP register that indicates a NOP operation is not performed.

The second pointer may point to a value in the distributed configuration memory that indicates a function that is performed by the controller.

The controller may increase the NOP register entry that the first pointer points to by one at all clock cycles and the controller may increase the entry of the distributed configuration memory that the second pointer points to by one when the first pointer points to a value in the NOP register that indicates a NOP operation is not performed.

The configuration information of the distributed configuration memory may be dynamically loaded from a memory storing configuration information for a plurality of functional units.

In another aspect, provided is a method of a reconfigurable processor, the processor having a plurality of processing units each of which includes a functional unit, a distributed configuration memory which stores configuration information of the functional unit, and a no-operation (NOP) register which stores information which represents whether or not a NOP operation is performed at a clock cycle, the method comprising deactivating the distributed configuration memory at a clock cycle at which a NOP operation is performed, and activating the distributed configuration memory at a clock cycle at which a NOP operation is not performed.

The method may further comprise managing an iteration interval, a first pointer which points to an entry of the NOP register, and a second pointer which points to an entry of the distributed configuration memory.

The distributed configuration memory may be deactivated when the first pointer points to a value in the NOP register that indicates a NOP operation is performed. The distributed configuration memory may be activated when the first pointer points to a value in the NOP register that indicates a NOP operation is not performed.

The managing an iteration interval may include increasing the NOP register entry that the first pointer points to by one at all clock cycles, and increasing the distributed configuration memory entry that the second pointer points to by one when the first pointer points to a value in the NOP register that indicates that a NOP operation is not performed in the NOP register.

The configuration information of the distributed configuration memory may be dynamically loaded from a memory storing configuration information for a plurality of functional units.

Other features and aspects will be apparent from the following detailed description, the drawings, and the claims.

Figure 1:
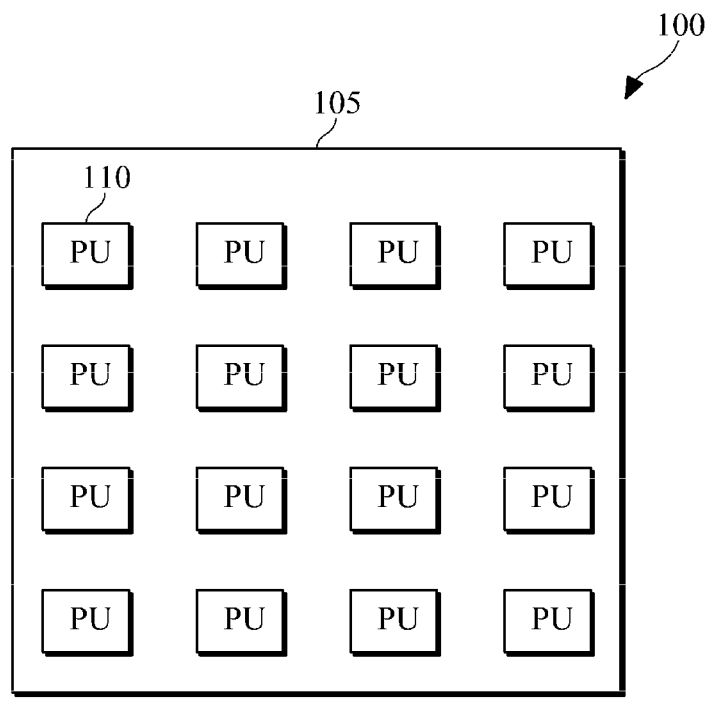
FIG. 1 is a block diagram illustrating an exemplary configuration of a reconfigurable is processor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

FIG. 1 illustrates an exemplary configuration of a reconfigurable processor.

The reconfigurable processor 100 of FIG. 1 includes a coarse-grained array 105. The coarse-grained array 105 processes a task that may be repetitively performed according to control of a core (not shown). The core may be, for example, a very long instruction word (VLIW) processor, or another type of processor. The task that is to be repetitively performed may be a task during which a large amount of data is processed such as a looping task, program, application, or the like. The coarse-grained array 105 includes a plurality of processing units 110.

Although omitted from FIG. 1 for simplicity, interconnections are present between the plurality of processing units 110. The processing units 110 may receive data from different sources and transmit a processing result to one or more destinations.

A processing unit commonly includes a functional unit and a register. A plurality of functional units included in a coarse-grained array are commonly operated using configurable information which is read in units of lines by a unified configurable memory.

A configuration memory stores various types of information, for example, information on operations performed by functional units included in a coarse-grained array, information on a processing unit which has a register file storing data which is used by functional units to perform operations, and information on whether a value generated as an operation result is stored in a register file or an external memory. Configuration information stored in a configuration memory may be classified into different groups, for example, information which is used directly by a functional unit, information which is used as a functional coefficient by a functional unit, information necessary for routing, and other information. Therefore, even when a functional unit does not use configuration information, a configuration memory continuously remains in an activated state, whereby power is continuously expended.

The processing unit 110 may not use configuration information read from a unified configuration memory. The processing unit 110 includes distributed configuration memories. The configuration memories may be dedicated to the functional units, for example, one configuration memory may be dedicated to one functional unit, a plurality of configuration memories may be dedicated to a functional unit, and/or a configuration memory may be dedicated to a plurality of functional units. According to an exemplary embodiment, the functional units included in the coarse-grained array 105 operate based on configuration information included in the distributed configuration memory dedicated to the functional units.

Configuration information of the distributed configuration memory may be statically or dynamically loaded from a memory. The memory may include configuration information for a plurality of functional units. The memory may be any desired type of memory, for example, a read only memory (ROM), random access memory (RAM) such as synchronous dynamic random access memory (SDRAM), a memory of a different type.

The distributed configuration memory may be configured to dynamically load configuration information such that a part of the distributed configuration memory provides a functional unit with configuration information, and a different part of the distributed configuration memory loads configuration information. In some embodiments, the distributed configuration memory may be configured in the form of a dual port memory or a double buffer.

Figure 2:
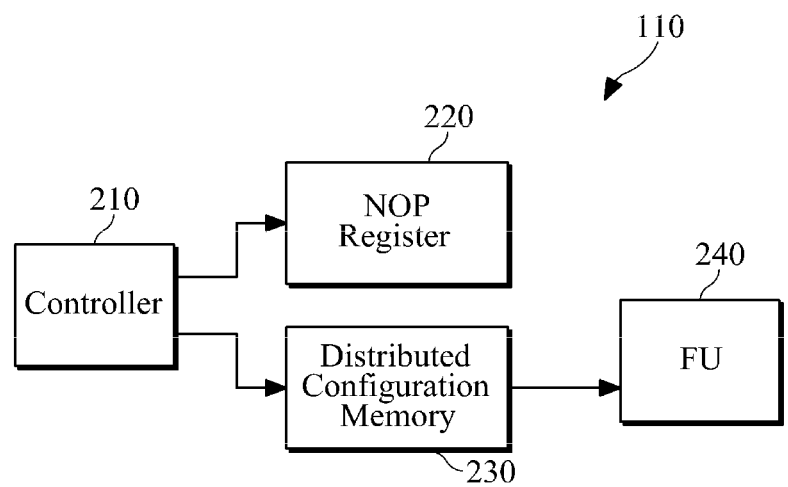
FIG. 2 is a block diagram illustrating a processing unit included in the reconfigurable processor of FIG. 1.

FIG. 2 illustrates a processing unit included in the reconfigurable processor of FIG. 1.

Referring to the non-limiting example illustrated in FIG. 2, the processing unit 110 includes a controller 210, a no-operation (NOP) register 220, a distributed configuration memory 230, and a functional unit 240. The processing unit 110 may further include a register (not shown) which stores an operation result of the functional unit 240. The processing unit 110 may further include a multiplexer (not shown) which is used for routing an operation result.

The functional unit 240 receives configuration information from the distributed configuration memory 230. The functional unit 240 performs an operation based on the received configuration information. Exemplary operations include addition, subtraction, multiply, compute, and the like.

The controller 210 controls the distributed configuration memory 240. For example the controller 210 may deactivate the distributed configuration memory 240 at a clock cycle at which a NOP operation is performed.

The NOP register 220 stores information that represents whether or not a NOP operation is to be performed and the clock cycle at which the NOP operation is to be performed. Information for representing whether or not a NOP operation is performed may be one-bit information, for example, a value of "1" or "0." In this example, the NOP register 220 may be configured so that one-bit information is read at each clock cycle.

For example, when the one-bit information value of the NOP register 220 is "1," the functional unit 240 may perform an operation according to configuration information received from the distributed configuration memory 230. On the other hand, when the one-bit information value of the NOP register 220 is "0," the functional unit 240 may perform a NOP operation, and the distributed configuration memory 230 may be deactivated, so that configuration information is not transmitted to the functional unit 240.

Iteration within a loop is performed at a regular time interval, and this time interval is referred to as an iteration interval. The distributed configuration memory stores configuration information necessary to perform the loop, and when configuration information of the distributed configuration memory is read in units of lines, the iteration interval may be the same as the number of lines of the distributed configuration memory 230.

In a non-limiting example, the controller 210 manages the iteration interval. A first pointer points to an entry of the NOP register 220 that indicates whether an NOP operation is to be performed. A second pointer points to an entry of the distributed configuration memory 230 that indicates an operation to be performed. The controller 210 activates the distributed configuration memory 230 when the first pointer points to a bit which has a value that represents that a NOP operation is not performed in the NOP register. The controller 210 may manage the iteration interval, for example, the controller 210 may count a clock cycle within the iteration interval.

The controller 210 may control the first pointer and the second pointer. For example, is the controller may increase the first pointer by one at each clock cycle. The controller may increase the second pointer by one when the first pointer points to an entry of the NOP register 220 that has a value that indicates a NOP operation is not performed in the NOP register.

In a coarse-grained array mode, power consumption is higher when configuration information is read from a configuration memory. Using the distributed configuration memory, the reconfigurable processor can effectively reduce power consumption because the distributed configuration memory is not activated when configuration information does not need to be read from a configuration memory to a functional unit. For example, when the one-bit information value of the NOP register 220 is "0," the functional unit 240 may perform a NOP operation, and therefore does not read configuration information from the configuration memory. The controller may deactivate the distributed configuration memory 230, thereby conserving power.

Power consumption may be further reduced when an operation that includes a high ratio of a NOP operations is performed. An exemplary operation is a loop program that is performed in a coarse-grained array and has a low amount of instructions per cycle (IPC). When the distributed configuration information is dynamically loaded to the distributed configuration memory at run time, a size or a depth of the distributed configuration memory may be reduced in comparison to when the distributed configuration information is statically loaded to the distributed configuration memory.

Figure 3:
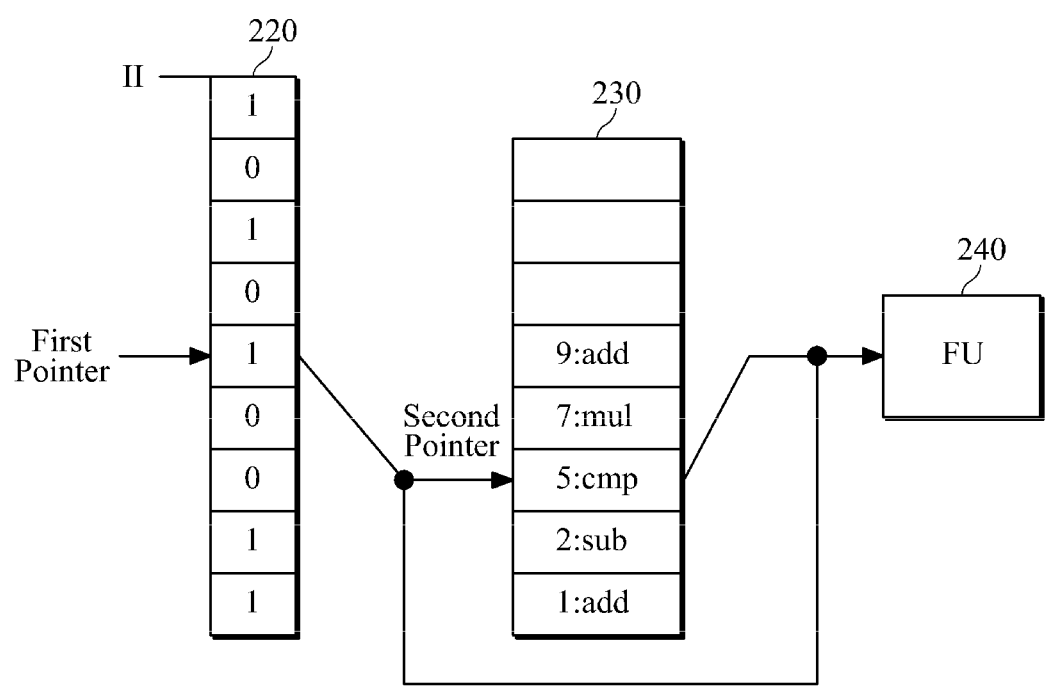
FIG. 3 is a diagram illustrating an exemplary operation of a processing unit.

FIG. 3 illustrates an exemplary operation of a processing unit.

In the non-limiting example shown in FIG. 3, the first pointer points to an entry of the NOP register 220, and the second pointer points to an entry of the distributed configuration memory 230. If the first pointer increases by one, the increased first pointer indicates the upper entry of the previously pointed entry in the NOP register 220, and if the second pointer increases by one, the increased second pointer indicates the upper entry of the previously pointed entry in the distributed configuration memory 230. When an entry value of the NOP register 220 is "1," it indicates that the NOP operation is not performed, and when an entry value of the NOP register 220 is "0," it indicates that the NOP operation is performed.

The controller 210 controls the first pointer and the second pointer. The controller may increase the first pointer by one at each clock cycle and increase the second pointer by one when the first pointer indicates a value which represents that a NOP operation is not performed in the NOP register. It is assumed that when a clock cycle is "1," the first pointer and the second pointer indicate lowest entries of the NOP register 220 and the distributed configuration memory 230, respectively.

In the example shown in FIG. 3, at clock cycle 1, an entry value that the first pointer points to is "1," and the entry of the distributed configuration memory 230 that the second pointer points to is "add." Accordingly, the functional unit 240 performs an add function. At clock cycle 2, the first pointer and the second pointer increase by one. At clock cycle 2, the entry value that the first pointer points to is "1," and entry value of the distributed configuration memory 230 that the second pointer points to is "sub." Accordingly, the functional unit 240 performs a sub function.

At clock cycle 3, the first pointer and the second pointer increase by one. At clock cycle 3, the entry value that the first pointer points to is "0." At this time, the distributed configuration memory 230 is deactivated by the controller 210, and the functional unit 240 performs a NOP operation in which configuration information is not read from the distributed configuration memory 230 and no operation is performed. At clock cycle 4, the first pointer points to an entry value that is "0", and similar to when a clock cycle is 3, the functional unit 240 performs a NOP operation.

When the clock cycle is 5, the entry value that the first pointer points to is "1," and the second pointer points to an entry value of "cmp." At this time, the distributed configuration memory 230 is activated, so that the functional unit 240 performs a cmp operation according to is configuration information read from the distributed configuration memory 230.

At clock cycle the first pointer points to an entry value of "0", therefore, the functional unit 240 performs a NOP operation in which configuration memory is not read from the distributed configuration memory 230. The distributed configuration memory 230 is deactivated at clock cycle 6.

At clock cycle 7, the first pointer points to an entry value of "1", thus, the controller activates the distributed configuration memory 230. The second pointer indicates an entry of "mul". Accordingly, the functional unit 240 performs a multiplication operation according to configuration information read from the distributed configuration memory 230. At clock cycle 8, the first pointer points to an entry of "0", therefore, the functional unit 240 performs a NOP operation in which configuration memory is not read from the distributed configuration memory 230. The distributed configuration memory 230 is deactivated at clock cycle 8.

At clock cycle 9, the first pointer points to an entry value of "1," thus, the controller activates the distributed configuration memory 230. The second pointer indicates an entry of "add." Accordingly, the functional unit 240 performs an add function.

When the iteration interval is 9 clock cycles as in FIG. 3, the controller 210 controls the first pointer to indicate the lowest entry of the NOP register 220 after the iteration interval of 9 clock cycles elapses. In this case, the second pointer also indicates the lowest entry of the distributed configuration memory 230, i.e., add.

Figure 4:
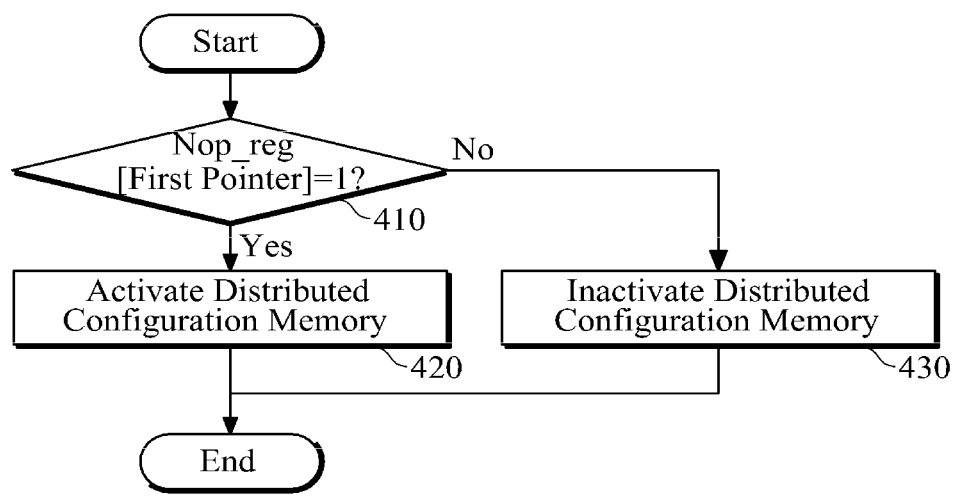
FIG. 4 is a flowchart illustrating an exemplary method of a reconfigurable processor.

FIG. 4 is a flowchart illustrating an exemplary method of a reconfigurable processor.

In a non-limiting example, the method of the reconfigurable processor may be performed on a processor as exemplified in FIG. 3. The reconfigurable processor may have a plurality of processing units, each of which includes a functional unit, a distributed configuration memory storing configuration information for an operation of the functional unit and routing, and a NOP is register storing information which represents whether or not a NOP operation is performed at a clock cycle. Here, the configuration information indicates a NOP operation is not stored in the distributed configuration memory.

In 410, the value of the NOP register that the first pointer is pointing to, represents that a NOP operation is not performed, for example, when an entry value of the NOP register is "1." In 420, the controller 210 activates the distributed configuration memory 230 and controls the functional unit 240 to operate according to configuration information received from the distributed configuration memory 230.

When a value of the NOP register is "0", in 430 the controller 210 deactivates the distributed configuration memory 240 and controls the functional unit 240 to operate a NOP operation.

In this exemplary method, the controller 210 manages the iteration interval, the first pointer which points to an entry of the NOP register 220, and the second pointer which points to an entry of the distributed configuration memory 230. The controller 210 may activate the distributed configuration memory 230 when the first pointer points to a value which represents that a NOP operation is not performed in the NOP register 220. The controller 210 may control to increase the first pointer by one at all clock cycles and increase the second pointer by one only when the first pointer points to a value which represents that a NOP operation is not performed in the NOP register.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, is such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As apparent from the above description, an exemplary reconfigurable processor using a distributed configuration memory deactivates the distributed configuration memory and does not read configuration information when a functional unit performs a NOP operation and thus reduces power consumption. Power consumption can be further reduced when an operation in which a ratio of a NOP operation is high is performed as in the case in which a loop having a low IPC is performed in a coarse-grained array.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reconfigurable processor, comprising:
a plurality of processing units, each of which includes:
 a functional unit;
 a distributed configuration memory which stores a plurality of configuration information of the functional unit;
 a no-operation (NOP) register which stores information which represents whether or not a NOP operation is performed at a respective clock cycle; and
 a controller configured to manage a first pointer which points to an entry of the NOP register, to activate or deactivate the distributed configuration memory based on an entry of the NOP register to which the first pointer points at the respective clock cycle, and to manage a second pointer which points to a configuration information from among the plurality of configuration information stored in the distributed configuration memory,
wherein the functional unit performs an operation based on the configuration information from the distributed configuration memory which is pointed to by the second pointer, at the respective clock cycle, while the distributed configuration memory is activated, and performs a NOP operation when the distributed memory is deactivated such that the functional unit does not read configuration information when the functional unit performs the NOP operation.

2. The reconfigurable processor of claim 1, wherein the controller manages an iteration interval.

3. The reconfigurable processor of claim 1, wherein the controller deactivates the distributed configuration memory when the first pointer points to a value in the NOP register that indicates a NOP operation is performed.

4. The reconfigurable processor of claim 1, wherein the controller activates the distributed configuration memory when the first pointer points to a value in the NOP register that indicates a NOP operation is not performed.

5. The reconfigurable processor of claim 1, wherein the second pointer points to a value in the distributed configuration memory that indicates a function that is performed by the controller.

6. The reconfigurable processor of claim 1, wherein the controller increases the NOP register entry that the first pointer points to by one at all clock cycles and increases the entry of the distributed configuration memory that the second pointer points to by one when the first pointer points to a value in the NOP register that indicates a NOP operation is not performed.

7. The reconfigurable processor of claim 1, wherein configuration information of the distributed configuration memory is dynamically loaded from a memory storing configuration information for a plurality of functional units.

8. A method of a reconfigurable processor, the processor comprising a plurality of processing units each of which includes a functional unit, a distributed configuration memory which stores a plurality of configuration information of a functional unit, and a no-operation (NOP) register which stores information which represents whether or not a NOP operation is performed at a respective clock cycle, the method comprising:
managing a first pointer which points to an entry of the NOP register;
activating or deactivating the distributed configuration memory based on an entry of the NOP register to which the first pointer points at the respective clock cycle; and
managing a second pointer which points to a configuration information from among the plurality of configuration information stored in the distributed configuration memory,
wherein the functional unit performs an operation based on the configuration information which is pointed to by the second pointer, at the respective clock cycle, while the distributed configuration memory is activated, and performs a NOP operation when the distributed memory is deactivated such that the functional unit does not read configuration information when the functional unit performs the NOP operation.

9. The method of claim 8, further comprising managing an iteration interval.

10. The method of claim 8, wherein the distributed configuration memory is deactivated when the first pointer points to a value in the NOP register that indicates a NOP operation is performed.

11. The method of claim 8, wherein the distributed configuration memory is activated when the first pointer points to a value in the NOP register that indicates a NOP operation is not performed.

12. The method of claim 9, wherein managing an iteration interval includes increasing the NOP register entry that the first pointer points to by one at all clock cycles, and increasing the distributed configuration memory entry that the second pointer points to by one when the first pointer points to a value in the NOP register that indicates that a NOP operation is not performed in the NOP register.

13. The method of claim 8, wherein configuration information of the distributed configuration memory is dynamically loaded from a memory storing configuration information for a plurality of functional units.

14. A processor comprising a plurality of processing units, one or more processing units comprising:
   a distributed configuration memory storing a plurality of operations to be performed;
   a functional unit for reading an operation from among the plurality of operations stored in the distributed configuration memory and for processing the read operation when the distributed configuration memory is activated;
   a no-operation (NOP) register for storing information indicating whether a NOP operation is to be performed; and
   a controller for managing a first pointer which points to an entry of the NOP register for deactivating the distributed memory, in response to an entry of the NOP register comprising an indication that a NOP operation is to be performed, and for managing a second pointer which points to a configuration information from among the plurality of configuration information stored in the distributed configuration memory,
   wherein the functional unit processes the NOP operation without reading an operation from the distributed configuration memory when the distributed configuration memory is deactivated.

15. The processor of claim 14, wherein the controller activates the distributed configuration memory, in response to a subsequent entry of the NOP register comprising an indication that a non-NOP operation is to be performed.

16. The processor of claim 14, wherein the controller increments the first pointer by one at each clock cycle, and the controller increments the second pointer by one only at a clock cycle in which the NOP register comprises an entry indicating that a non-NOP operation is to be performed.

* * * * *